No. 721,249. PATENTED FEB. 24, 1903.
M. V. B. STIMSON.
TABLE FORK.
APPLICATION FILED JULY 16, 1902.
NO MODEL.
Fig I
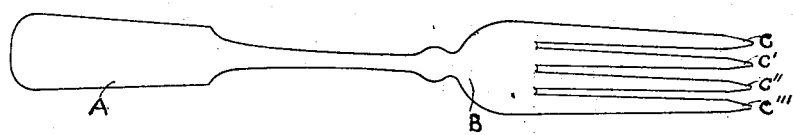
Fig II
Fig III
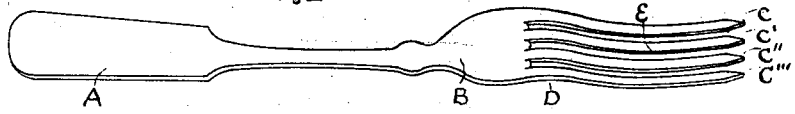
WITNESSES:
Arch. M. Main,
May T. Bray.
M. V. B. Stimson
INVENTOR
BY J. A. Stover
ATTORNEY

UNITED STATES PATENT OFFICE.

MARTIN V. B. STIMSON, OF GROTON, CONNECTICUT.

TABLE-FORK.

SPECIFICATION forming part of Letters Patent No. 721,249, dated February 24, 1903.

Application filed July 16, 1902. Serial No. 115,871. (No model.)

*To all whom it may concern:*

Be it known that I, MARTIN VAN BUREN STIMSON, residing at Groton, in the county of New London and State of Connecticut, have invented certain new and useful Improvements in Table-Forks, of which the following is a specification.

My invention relates to an improvement in table-forks in which a plurality of tines are conjoined in a shank and similarly curved or bent upward and downward from the plane of the axis of the handle of the fork in such a manner as to form on both the front and rear surfaces of the tines concave and convex portions.

The object of my invention is to provide a table-fork that can be conveniently used by all and particularly by those who do not enjoy the natural freedom of motion in hand or arm.

The advantage procured by the concave surface on both the front and rear faces of the tines of the fork in facilitating the retention thereon of food and obviating the necessity for constantly turning the fork in the hand is apparent.

Figure I of the accompanying drawings represents a plan view of the fork; Fig. II, a side elevation. Fig. III shows the fork tilted up and slightly in perspective.

In the drawings, A represents the handle; B, the shank; C, C', C'', and C''', the tines, curved or bent upward and downward from the plane of the axis of the handle A, forming at D a rearwardly-convex surface and at E a rearwardly-concave surface. Fig. II shows the compound curve of the tines, and Fig. III the rear concave surface.

It is obvious that, if desired, the tines may be conjoined in the shank at a point nearer the handle than is shown in the drawings.

Having described my invention, what I claim as new, and desire to secure by Letters Patent, is—

1. As a new article of manufacture, a table-fork, having a plurality of tines, similarly curved or bent upward toward and downward from the plane of the axis of the handle, forming on both their front and rear faces, concave and convex surfaces, substantially as and for the purposes set forth.

2. The combination in a table-fork of a handle A, a shank B, and the tines C, C', C'', C''', similarly curved or bent upward toward and downward from the plane of the axis of said handle A, forming upon their front face a concave and a convex surface and upon their rear face, conversely, a convex and a concave surface, substantially as and for the purposes set forth.

MARTIN V. B. STIMSON.

Witnesses:
LYMAN D. STEVENS,
BENJAMIN W. COUCH.